United States Patent
Eggers et al.

(10) Patent No.: US 8,149,093 B2
(45) Date of Patent: Apr. 3, 2012

(54) SYSTEM AND METHOD FOR WIRELESS COMMUNICATIONS

(75) Inventors: Patrick Claus Friedrich Eggers, Lystrup (DK); Boyan Radkov Yanakiev, Aalborg Ø (DK); Gert Frølund Pedersen, Storvorde (DK); Alex Oprea, Toronto (CA)

(73) Assignee: Lyngsoe Systems, Mississauga, Ontario (CA)

( * ) Notice: Subject to any disclaimer, the term of this patent is extended or adjusted under 35 U.S.C. 154(b) by 910 days.

(21) Appl. No.: 12/134,710

(22) Filed: Jun. 6, 2008

(65) Prior Publication Data

US 2009/0303006 A1 Dec. 10, 2009

(51) Int. Cl.
*H04Q 5/22* (2006.01)
*H04Q 1/00* (2006.01)
*H04Q 9/00* (2006.01)
*G08B 13/14* (2006.01)
*G08B 1/08* (2006.01)
*G08B 29/00* (2006.01)
*G05B 19/00* (2006.01)
*G05B 23/00* (2006.01)
*G06F 7/00* (2006.01)
*G08C 19/00* (2006.01)
*H04B 1/00* (2006.01)
*H04B 3/00* (2006.01)

(52) U.S. Cl. .............. 340/10.1; 340/10.4; 340/10.5; 340/572.1; 340/539.13; 340/5.92; 342/22

(58) Field of Classification Search .......... 340/572.1, 340/539.13, 5.92, 10.1, 10.4, 10.5; 342/1–205
See application file for complete search history.

(56) References Cited

U.S. PATENT DOCUMENTS

| | | | |
|---|---|---|---|
| 5,510,795 A | 4/1996 | Koelle | |
| 5,570,094 A * | 10/1996 | Armstrong | 342/107 |
| 5,594,448 A * | 1/1997 | d'Hont | 342/44 |
| 6,046,683 A | 4/2000 | Pidwerbetsky et al. | |
| 6,223,606 B1 * | 5/2001 | Burke et al. | 73/862.041 |
| 6,868,073 B1 * | 3/2005 | Carrender | 370/278 |
| 7,119,738 B2 | 10/2006 | Bridgelall et al. | |
| 7,170,412 B2 | 1/2007 | Knox et al. | |
| 7,884,753 B2 * | 2/2011 | Peczalski et al. | 342/44 |
| 2002/0113709 A1 * | 8/2002 | Helms | 340/572.7 |
| 2002/0126013 A1 * | 9/2002 | Bridgelall | 340/572.1 |
| 2002/0181851 A1 * | 12/2002 | Brown et al. | 385/18 |
| 2004/0257228 A1 * | 12/2004 | Tsuji | 340/552 |
| 2005/0114108 A1 * | 5/2005 | Cooper et al. | 703/8 |
| 2005/0259769 A1 * | 11/2005 | Wang et al. | 375/346 |

(Continued)

FOREIGN PATENT DOCUMENTS

WO WO 2005081682 A2 * 9/2005

OTHER PUBLICATIONS

Patrick C.F. Eggers, et al., "Measurements of Complex Envelopes of Mobile Scenarios at 450 MHz," IEEE Transactions on Vehicular Technology, May 1989, pp. 37-42, vol. 38, No. 2, IEEE.

(Continued)

*Primary Examiner* — Daniel Wu
*Assistant Examiner* — Kam Ma

(57) ABSTRACT

A method of detecting position of a moving RFID tag relative to an antenna, includes continually receiving a signal from the RFID tag at the antenna. The phase of the received signal over a time period is detected and, based on a maximum detected phase, the position of the RFID tag relative to the antenna is detected.

15 Claims, 4 Drawing Sheets

U.S. PATENT DOCUMENTS

2007/0073513 A1 3/2007 Posamentier
2008/0150699 A1* 6/2008 Ohara et al. .............. 340/10.4

OTHER PUBLICATIONS

Takaaki Nara, et al., "A Closed-Form Formula for Magnetic Dipole Localization by Measurement of Its Magnetic Field and Spatial Gradients," IEEE Transactions on Magnetics, Oct. 2006, pp. 3291-3293, vol. 42, No. 10, IEEE.

Pavel V. Nikitin, et al., "An Overview of Near Field UHF RFID," 2007 IEEE International Conference on RFID, Mar. 26-28, 2007, pp. 167-174, IEEE, Grapevine, Texas, U.S.A.

Yimin Zhang, et al., "Localization and Tracking of Passive RFID Tags Based on Direction Estimation," International Journal of Antennas and Propagation, Mar. 1, 2007, pp. 1-9, vol. 2007, Article ID 17426, Hindawi Publishing Corporation.

Boyan Yanakiev, "Advanced u-Localization of Passive RFID Tags," Worksheets, Jun. 2007, 45 pages.

Boyan Yanakiev, et al., "Assessment of the Physical Interface of UHF Passive Tags for Localization," pp. 1-4, Department of Electronic Systems, Aalborg University, Aalborg, Denmark, Sep. 2007.

* cited by examiner

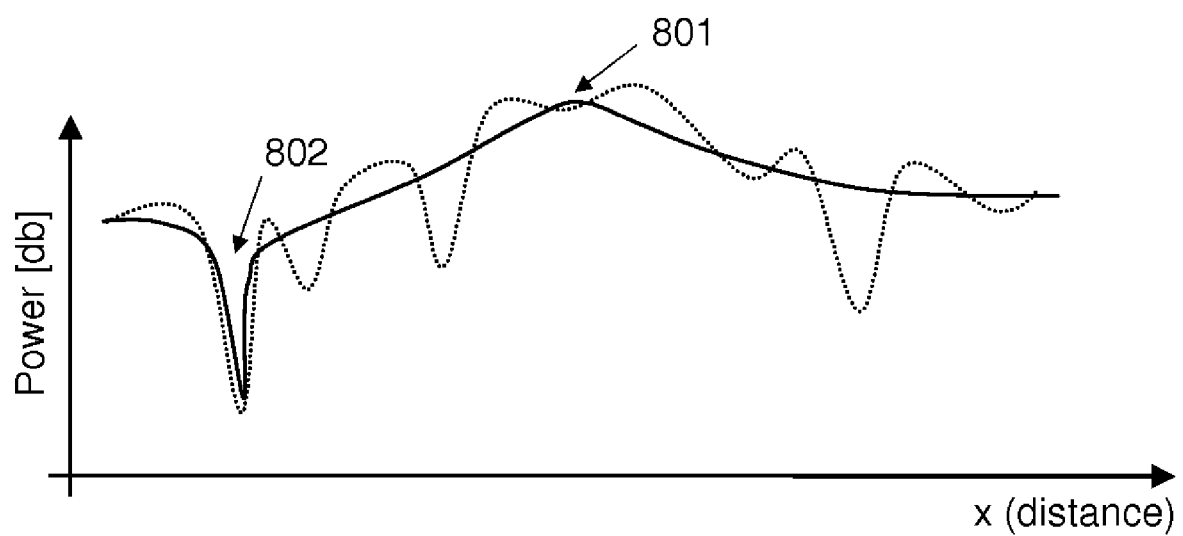

SYSTEM AND METHOD FOR WIRELESS COMMUNICATIONS

TECHNICAL FIELD

The following relates to RFID systems and, more particularly, to a method and apparatus for micro-localization of UHF passive RFID tags moving along a known, unidirectional path.

TECHNICAL BACKGROUND

Radio Frequency Identification (RFID) systems use RFID tags to identify and/or track objects or living things. Typically, the tags are affixed to respective objects and when these tags are excited, they produce or reflect a magnetic or electric field at some frequency. The reflected field is modulated with an identifying code to identify the particular tag, and/or other useful information.

An RFID tag may either be active or passive. Whereas active tags have a self-contained power supply and signal source, a passive tag receives an exciting signal at an exciting frequency from a transmitting antenna of an interrogator or reader positioned. Typically, the transmitting antenna is positioned at a portal. The exciting signal causes the RFID tag to transmit a signal, which is received by a receiving antenna adjacent to the transmitting antenna. The receiving antenna receives the modulated signal (magnetic or electromagnetic) produced by the excited tag and consequently the tag and the object to which it is attached can be identified.

Interest in adopting RFID technology for use in automation systems and requiring minimal manual involvement is increasing rapidly. RFID systems are capable of providing real-time object visibility enabling continuous identification and location of all items and thereby providing real-time data management instead of simple snapshots.

While the use of RFID tags is well known, most current RFID systems do not have the ability to locate fast moving tags (two meters per second i.e. 2 m/s or higher) with the accuracy required in many applications. Complexities are attributable to various factors including that the horizontal and vertical dimensions of the detection volume in which the RFID tags are to be read may contain several tags producing several signals, as well as noise, reflections and polarization losses.

Prior approaches for addressing such complexities include confining the RF waves to a small volume using RF reflecting and absorbent materials, and/or controlling the angular extent of the interrogation zone (and thus the tag transmission zone) by using a two-element antenna to transmit a data signal with a directional sum pattern and a scrambled signal with a complementary difference pattern. Other approaches include the use of techniques relating to Doppler shift and triangulation.

While various techniques for localization of RFID tags are known, improvements are of course desirable.

It is an object of an aspect of the following to provide a method and system for wireless communications that addresses at least one of the above complexities.

Overview

According to one aspect there is provided a method of detecting position of a moving RFID tag relative to an antenna, comprising:

continually receiving a signal from the RFID tag at the antenna;

detecting the phase of the received signal over a time period; and based on a maximum detected phase detecting the position of the RFID tag relative to the antenna.

BRIEF DESCRIPTION OF THE DRAWINGS

Embodiments will now be described more fully with reference to the accompanying drawings, in which:

FIG. 8 is a graph showing the averaged power trajectory of the received signal from an RFID tag moving under an Interrogator antenna.

DETAILED DESCRIPTION OF THE EMBODIMENTS

Figure 1:
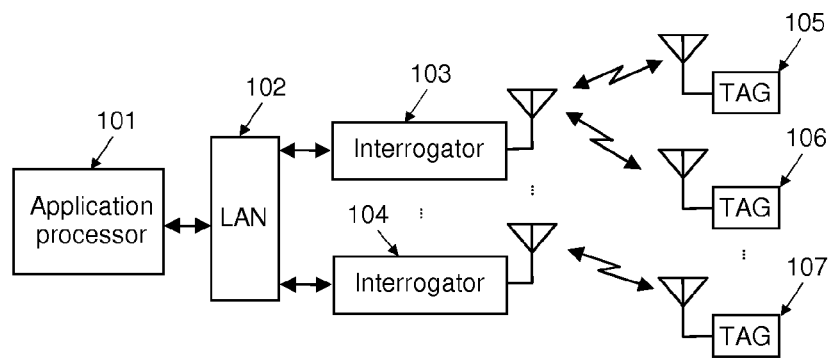
FIG. 1 shows a block diagram of an illustrative Radio Frequency Identification (RFID) system.
Figure 2:
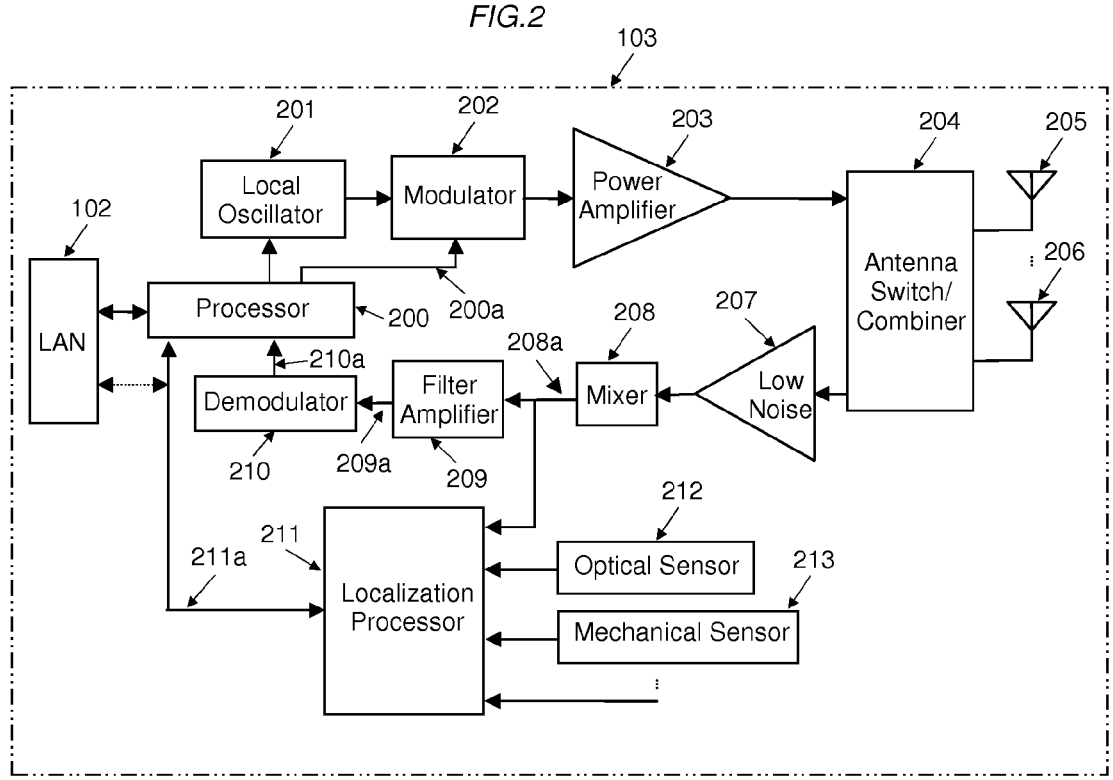
FIG. 2 shows a block diagram of an Interrogation unit used in the RFID system of FIG. 1, equipped with a Localization Processor.

Referring to FIG. 1, shown therein is a block diagram of an RFID system using passive technology (modulated backscattering). An Application Processor 101 communicates over Local Area Network 102 to a plurality of Interrogators 103-104. The Interrogators may then each communicate with one or more of the Tags 105-107. In reference with FIG. 2, the Interrogator 103 receives commands and information from an Application Processor 101. A Processor 200 formats an Interrogator-Tag message (200a) based on the command and information received from the application Processor 101 to be sent to the Tag. The information signal (200a) may include information specific to Tag such as which Tag is to respond (each Tag may have a programmed identification number), instructions for the Tag's processor to execute or other information to be used and/or stored by the Tag's processor. With reference to FIG. 2, Local Oscillator 201 synthesizes a carrier wave (CW) signal, the Modulator 202 modulates the CW using Information Signal 200a and the Power Amplifier 203 applies the signal to an Antenna Switch/Combiner 204. The Antenna Switch/Combiner 204 applies the amplified modulated signal to one or several transmit/receive antennae 205-206.

Figure 3:
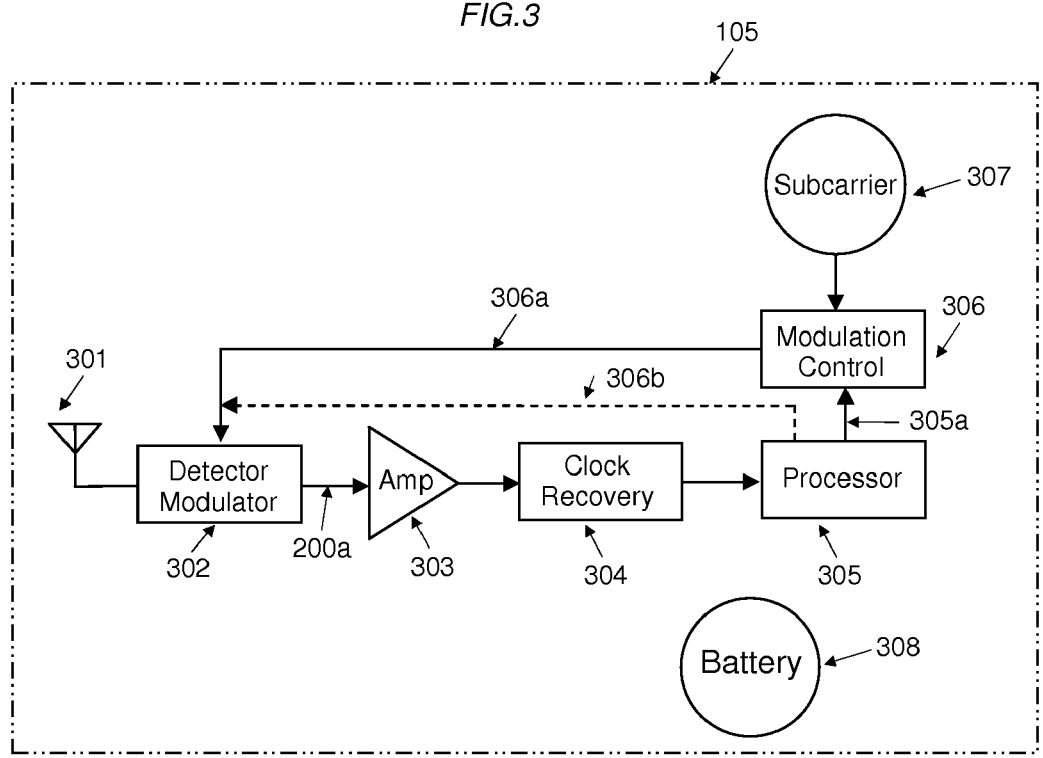
FIG. 3 shows a block diagram of an RFID tag used in the RFID system of FIG. 1.

In the Tag 105 (see FIG. 3), the antenna 301 receives the modulated signal. This signal is demodulated directly to baseband, using the Detector/Modulator 302. The Information Signal 200a is then amplified by Amplifier 303 and bit synchronization is recovered in Clock Recovery circuit 304. The resulting information detected using the recovered clock is sent to a tag Processor 305. The processor 305 generates an Information Signal 305a based on the particular program executed by processor 305. Signal 305a is eventually communicated to be sent from the Tag 105 back to the Interrogator (e.g. 103). Information Signal 305a is sent to a Modulator Control circuit 306 which uses the Information Signal 305a to modulate a subcarrier frequency generated by the Subcarrier generator 307 to produce signal 306a. The Modulated Subcarrier 306a is used by the Detector/Modulator 302 to modulate the CW received from Tag 105 to produce a backscattered (i.e. reflected) signal. A Battery 308 or other power supply provides power to the circuitry of Tag 105. Power may also be received, for example, by using inductive coupling or microwaves.

Returning to FIG. 2, the Interrogator 103 receives the modulated and reflected signal with the Antennae 205-206, amplifies the signal with a Low Noise Amplifier 207 and demodulates the signal using a Quadrature Mixer 208. Using the same Local Oscillator 201 as used in the transmit chain means the demodulation to baseband is done using Homodyne detection; this has advantages in that the received signal has the same reference as the Local Oscillator signal and it greatly reduces phase noise in the receiver. The Mixer 208 then sends the Quadrature Demodulated Signal 208a to a Filter/Amplifier 209 and a location processor 211. The filtered and amplified signal—typically an Information Signal 209a carried on a subcarrier—is them demodulated from the subcarrier in the Demodulator 210 which then sends the Information Signal 210a to a Processor 200 to determine the content of the message.

Using the above techniques, as an example an inexpensive, short-range, bi-directional digital radio communications channel can be implemented.

Figure 4:
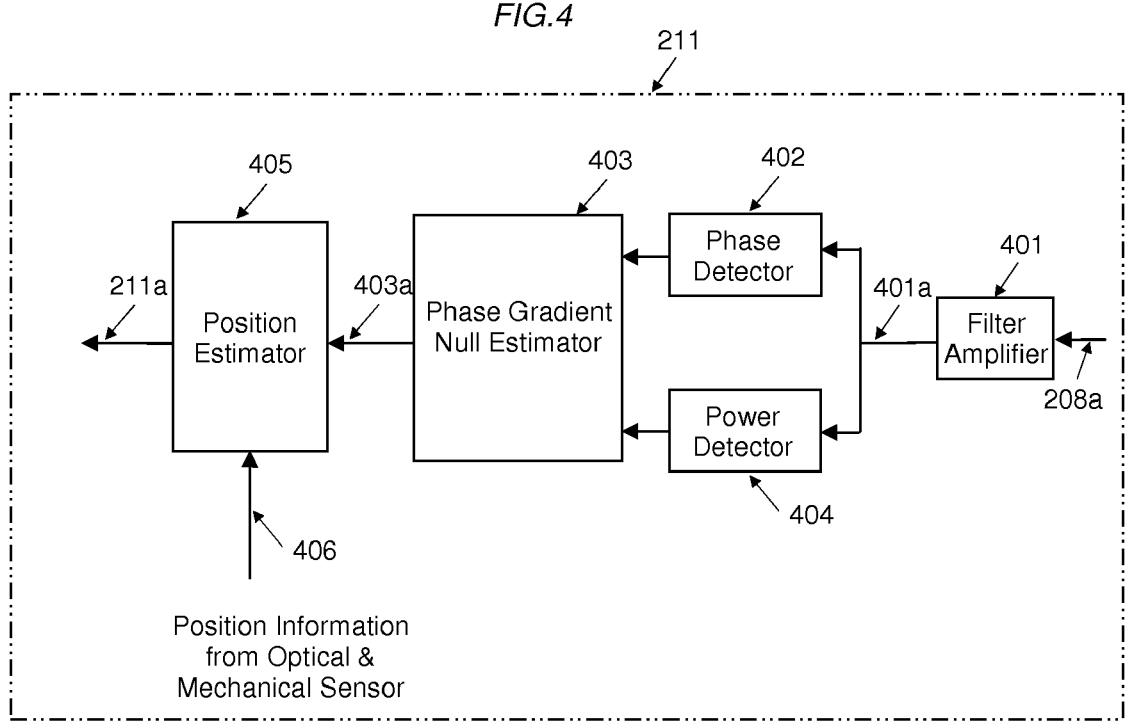
FIG. 4 shows a block diagram of the Localization Processor used in the Interrogator of FIG. 2.

We discuss know how a Modulated Backscattering system is used to determine the relative position between a Tag and an Interrogator antenna, as an example. For this example, assume that the Tag is moving in a constant direction and at a constant velocity under an Interrogator antenna during the period of time the measurement will be taken. Returning to FIG. 2, the Quadrature Signal 208a at the output of the Quadrature Mixer 208 is also applied to the Localization Processor 211. The Localization Processor also receives Position Information Signals from an Optical Sensor 212 and/or Mechanical Sensor 213, or any other position sensors. The Localization Processor 211 sends commands to the Processor 200 to specify which Tag is to respond, transmit power, antenna selection, and Information Signals such as Tag position estimate. The block diagram of the Localization Processor 211 is shown in FIG. 4. The Quadrature Signal 208a is filtered to remove data modulation and preserve only amplitude and phase changes caused by the Tag moving and then amplified by the Filter/Amplifier 401; the Filter/Amplifier 401 may or may not have the same characteristics as the Interrogator main Filter/Amplifier 209. The filtered and amplified signal 401a is applied to a Phase Detector 402. The Phase Detector 402 measures the phase deference between the transmitted signal (Local Oscillator) and the received signal. The phase difference is represented as:

$$\phi = a\tan(q/i)$$

where: q is the quadrature-phase component of the demodulated signal; and
i is the in-phase component of the demodulated signal.

Figure 5:
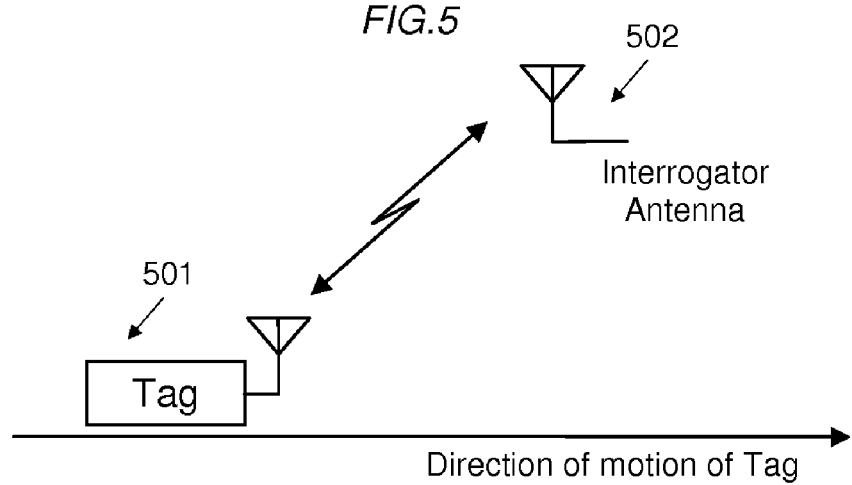
FIG. 5 shows the relative position between a moving RFID tag and the Interrogator antenna during phase and power measurements.
Figure 6:
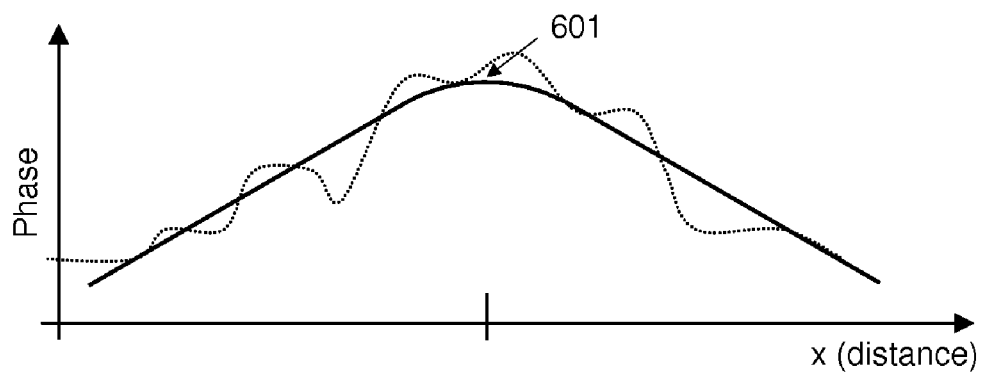
FIG. 6 is a graph showing the averaged phase trajectory of demodulated signal received by an RFID tag moving under an Interrogator antenna.

FIG. 6 is a graph of the averaged phase trajectory (solid line) of demodulated signal received by an RFID tag moving under an Interrogator antenna. Raw data phase trajectory with multi path influence is shown as broken curve. Referring to FIGS. 5 and 6, as a Tag 501 is moving along direction x approaching an Interrogator antenna 502, the received signal phase increases reaching a peak 601 at the antenna passing point, then it decreases when the tag is moving away from the antenna.

Figure 7:
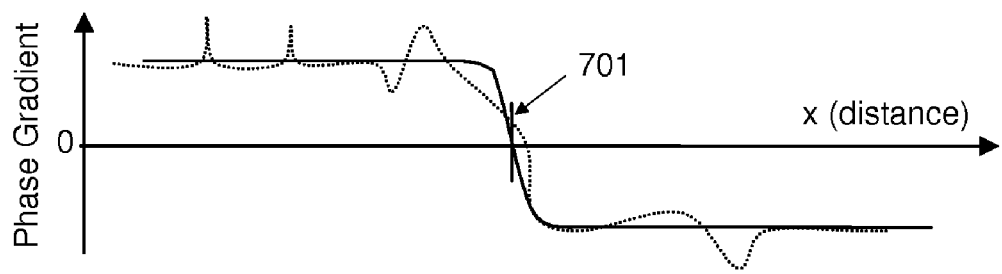
FIG. 7 is a graph showing the average trajectory of the gradient of the phase of the signal received from an RFID tag moving under an Interrogator antenna.

FIG. 7 shows the average trajectory of the gradient of the phase (solid line) of the signal received from a tag moving under an Interrogator antenna. Raw data phase gradient trajectory with multi path influence is shown as broken curve. FIG. 8 shows the averaged power trajectory (solid line) of the received signal from a tag moving under an Interrogator antenna. Raw data power trajectory with multi path influence is shown as broken curve.

The mean phase spatial gradient is represented as:

$$\phi' = d\phi/dx$$

where: $d\phi$ is the phase differential; and
$dx$ is the differential displacement.

As can be seen in FIG. 7, $d\phi$ crosses the zero line when the Tag passes by the antenna. By accurately detecting the zero crossing of the mean phase gradient, one can determine the moment a Tag passes a known position.

For a single signal propagation path, the mean spatial gradient of the phase of the signal equals the mean Doppler, fd. In a practical situation, reflecting structures present in the vicinity of reading point cause a rich multipath radio propagation environment. In multipath channels, the mean phase spatial gradient is commonly denoted 'random-FM'. The mean Doppler and the mean phase gradient are not always identical in multipath environments. However, this has no practical impact on the detection of the zero crossing point as only relative behavior of phase gradient before and after antenna passing point is needed for the identification of the zero crossing and consequently the antenna passing point.

The multipath effect and measurement noise makes it difficult to detect the peak of the phase trajectory directly from measurements. The multipath propagation causes random phase jumps/steps (for the phase gradient this appears as random-FM transients/'spikes'). Furthermore, different antennae connected to the same Interrogator may show a different peak position and different overlaid phase jumps.

The phase gradient zero-crossing detection is performed by a Phase Gradient Null Estimator 403 as follows. First, the phase trajectories are found from the raw data received. Obvious outliers (jumps) are then detected, and mean powers around these jumps are measured using a Power Detector 404. The measurements are weighted according to a relationship between instant power and magnitude of phase gradient transient. More particularly, instant power monitoring is used more precisely to identify outliers in phase and phase gradient. Following this, signal smoothing is performed. Finally, the measurements are averaged and a new phase peak estimate is extracted. Higher order phase derivatives can also be used to refine the passing point estimation. For example the $2^{nd}$ order derivative of the phase (the phase curvature) can be used to identify a turn tangent occurring at the passing point. Furthermore, in more sophisticated implementations, the Phase Peak Estimator 403 can be a Kalman filter followed by a linear regression of the phase gradient to find the phase gradient trajectory zero crossing that also identifies the antenna passing point.

The Phase Peak Information Signal 405a is applied to a Position Estimator 406 along with additional Position Information from Optical and Mechanical sensors 407. Other auxiliary dimension, range or position information may be used and be retrieved from typical sensor systems and sources found in RFID and parcel applications, such as X-ray imaging, weight scale; acoustic/ultra-sound ranging and imaging, visual video and imaging, other radio radar. Finally, the Tag Position Information 211a is passed to the Interrogator Processor 200, along with other Tag information such as Tag identification number.

To narrow the Tag activation zone, the Interrogator antennae can be tilted to steer a null 702 in front of the reading gate (see FIG. 5).

Multiple antenna Interrogators can be used to compensate for random phase variation accompanying the envelope abrupt change caused by multipath. Combining phase information acquired by each antenna, one can smooth the phase gradient and compensate for correlated effects such as those caused by equipment imperfections. Speed sensors can be used to take into account tag speed variations.

The method and system may be embodied in a software application including computer executable instructions executed by a processing unit such as a personal computer or other computing system environment. The software application may run as a stand-alone digital image/video editing tool or may be incorporated into other available digital image/video editing applications to provide enhanced functionality to those digital image video editing applications. The software application may comprise program modules including routines, programs, object components, data structures etc. and be embodied as computer readable program code stored on a computer readable medium. The computer readable medium is any data storage device that can store data, which can thereafter be read by a computer system. Examples of computer readable media include for example read-only memory, random-access memory, CD-ROMs, magnetic tape and optical data storage devices. The computer readable program code can also be distributed over a network including coupled computer systems so that the computer readable program code is stored and executed in a distributed fashion.

Although embodiments have been described, those of skill in the art will appreciate that variations and modifications may be made without departing from the spirit and scope of the invention defined by the appended claims.

What is claimed is:

1. An object localization system comprised of backscattering tags attached to objects moving along a known unidirectional path and interrogators, wherein each of said interrogators comprises:
    an antenna system to transmit and receive radio frequency (RF) signals to and from said backscattering tags;
    a transmitter and a receiver using homodyne down-conversion;
    a localization processor for providing tag position information, wherein said localization processor estimates the position of one of said backscattering tags based on phase measurement and comprises:
        i) a phase detector;
        ii) a power detector;
        iii) a phase gradient null estimator; and
        iv) a position estimator,
    wherein one of said interrogators receives one of said RF signals backscattered by one of said backscattering tags with a single antenna, and wherein said phase gradient null estimator estimates location of the zero phase gradient of the tag backscattered signal by performing the following algorithm: first, local phase jumps are found from raw data and obvious outliers are detected; then local instantaneous power relative to mean power around phase peaks is used to identify and filter the local phase jumps to smooth out phase trajectory and further improve gradient zero crossing detection and consequently locate the position of the one of said backscattering tags.

2. The object localization system of claim 1, wherein one of said interrogators receives one of said RF signals backscattered by one of said backscattering tags with several antennae, and wherein said phase gradient estimator is used to identify the local phase jumps per antenna and combine weighted information from several antennae to smooth out the phase trajectory and improve combined phase gradient zero crossing detection and consequently locate the position of one of said backscattering tags.

3. The object localization system of claim 2, wherein said phase gradient null estimator uses a Kalman filter followed by a linear regression of the phase gradient of one of said RF signals to find phase trajectory zero crossing that also identifies a passing point of each of said antenna.

4. The object localization system of claim 1, wherein at least one optical position sensor and one mechanical position sensor is used to further enhance position estimation.

5. The object localization system of claim 1, wherein at least one acoustic/ultra-sound position sensor system is used to further enhance position estimation.

6. The object localization system of claim 1, wherein at least one weight position sensor is used to further enhance position estimation.

7. The object localization system of claim 1, wherein antennae are tilted to steer nulls to narrow tag activation zone.

8. An object localization system comprising:
    at least one backscattering tag attached to an object moving along a known unidirectional path; and
    at least one interrogator comprising:
        an antenna system to transmit and receive radiofrequency signals to and from said at least one backscattering tag; and
        a localization processor for providing position information of said at least one backscattering tag, said localization processor comprising a phase gradient null estimator for estimating location of zero phase gradient,
    wherein said localization processor estimates the position of said at least one backscattering tag based on a phase measurement of at least one received signal from the at least one backscattering tag; and
    wherein said at least one interrogator receives at least one received signal backscattered by the at least one backscattering tag with a single antenna, and wherein said phase gradient null estimator is capable of estimating location of zero phase gradient of the at least one received signal by finding local phase jumps from raw data and detecting outliers and using local instantaneous power relative to mean power around phase peaks to identify and to filter the local phase jumps to smooth out phase trajectory and improve gradient zero crossing detection.

9. The object localization system of claim 8, wherein said antenna system further comprises a transmitter and a receiver that use homodyne down-conversion.

10. The object localization system of claim 8, wherein said at least one interrogator receives at least one received signal backscattered by the at least one backscattering tag with a plurality of antenna, and wherein said phase gradient null estimator is used to identify the local phase jumps per antenna in the plurality of antennae and combine the weighted information from the plurality of antennae to smooth out the phase trajectory and improve the combined phase gradient zero crossing detection.

11. The object localization system of claim 10, wherein said phase gradient null estimator uses:
    a Kalman filter; and
    a linear regression of the phase gradient of one of said received signal to estimate phase trajectory zero crossing and passing point of each of said antenna.

12. The object localization system of claim 10, wherein said phase gradient null estimator uses:

the second order derivative of the phase gradient transient to estimate passing point of each of said antenna.

13. The object localization system of claim 8, wherein at least one optical position sensor and at least one mechanical position sensor is used to further enhance position estimation.

14. The object localization system of claim 8, wherein said at least one interrogator receives at least one received signal backscattered by the at least one backscattering tag with at least one antennae tilted to steer nulls to narrow tag activation zone.

15. The object localization system of claim 8, wherein the localization processor further comprises:

a phase detector;

a power detector; and a position estimator.

* * * * *